(12) United States Patent
Christian

(10) Patent No.: US 6,591,544 B1
(45) Date of Patent: Jul. 15, 2003

(54) CAGE FOR TRAPPING CRUSTACEANS

(75) Inventor: Peter H. Christian, Uxbridge, MA (US)

(73) Assignee: Riverdale Mills Corporation, Northbridge, MA (US)

( * ) Notice: Subject to any disclaimer, the term of this patent is extended or adjusted under 35 U.S.C. 154(b) by 0 days.

(21) Appl. No.: 10/196,783

(22) Filed: Jul. 17, 2002

(51) Int. Cl.[7] .............................................. A01K 69/06
(52) U.S. Cl. ...................................................... 43/100
(58) Field of Search .................. 43/100–105; D22/119, D22/121

(56) References Cited

U.S. PATENT DOCUMENTS

| | | | |
|---|---|---|---|
| 427,049 A | 5/1890 | Cochennour | 43/100 |
| 605,834 A | * 6/1898 | Albury | 43/100 |
| 3,029,546 A | 4/1962 | Ruiz | 43/105 |
| 3,172,229 A | 3/1965 | Swanson et al. | 43/65 |
| 3,300,890 A | 1/1967 | Thomassen | 43/100 |
| 3,800,464 A | 4/1974 | Parker | 43/100 |
| 3,987,572 A | 10/1976 | Bieser et al. | 43/4.5 |
| 4,445,295 A | 5/1984 | Litrico | 43/102 |
| 4,538,375 A | 9/1985 | Kelley | 43/77 |
| 4,819,369 A | 4/1989 | Bodker | 43/102 |
| 4,858,372 A | 8/1989 | Ray | 43/55 |
| 4,929,350 A | 5/1990 | Wade et al. | 210/157 |
| 4,959,922 A | 10/1990 | Rhodes | 43/100 |
| 5,076,007 A | 12/1991 | Rhodes | 43/100 |
| 5,119,584 A | 6/1992 | Rhodes | 43/100 |
| 5,237,768 A | 8/1993 | Kiekhafer et al. | 43/4.5 |
| 5,561,936 A | 10/1996 | Franke | 43/7 |
| 5,617,813 A | 4/1997 | Loverich et al. | 119/223 |
| 5,943,812 A | 8/1999 | Pizzolato | 43/58 |
| 6,386,146 B1 | * 5/2002 | Knott, Sr. | 119/223 |

OTHER PUBLICATIONS

"Atlantic Aquaculture" http://adgwebserv.com/atlantic/index.htm.
"CatchNBait Supply Company: Pinfish & Bait Traps" http://www.catchnbait.com/baittraps.html.
"Fish Traps & Cages" http://www.thomasstrapping.com/fish.htm.
"Fish Traps and Supplies"0 http://www.memphisnet.net/FishCatalog/FishTraps.html.
"Fukui Fish Traps" http://www.coastalaquacultural.com/fukuif.htm.
"Maintaining Good Fishing" http://ohioline.osu.edu/b374/b374_7.html.

* cited by examiner

Primary Examiner—Charles T. Jordan
Assistant Examiner—Kimberly S. Smith
(74) Attorney, Agent, or Firm—Samuels, Gauthier & Stevens, LLP

(57) ABSTRACT

A truncated right circular conical cage for trapping crustaceans comprises circumferential spaced fill wires converging from a circular base of the cage to a reduced diameter upper opening of the cage. Mutually spaced line wires encircle the cage and intersect the fill wires at cross over locations to thereby define discrete openings. The line wires are secured to the fill wires at the cross over locations, and are indented between the cross over locations to accommodate the convergence of the fill wires.

5 Claims, 2 Drawing Sheets

CAGE FOR TRAPPING CRUSTACEANS

BACKGROUND OF THE INVENTION

1. Field of the Invention

This invention relates generally to submersible traps that are deployed on a sea bed to capture crabs and other like crustaceans, and is concerned in particular with improvements in the construction and manufacture of such traps.

2. Description of the Prior Art

The submersible crab traps currently in use typically comprise truncated right circular conical cages, with an enlarged diameter bottoms close by seines, and reduced diameter top openings supporting entry funnels. Bait is suspended in the cages to attract crabs. The crabs crawl up the sides of the cages and enter via the entry funnels. Once in the cages, the crabs are prevented from escaping by the reverse slope of the cage walls.

The trap cages are conventionally constructed of steel reinforcing bar and nylon netting. As such, they are expensive to produce, in addition to being relatively heavy, cumbersome, and difficult to deploy and retrieve in the rough seas and adverse weather conditions often encountered by crab fisherman.

A need exists, therefore, for an improved cage structure that is less expensive to produce, lighter, and thus easier to deploy and retrieve.

SUMMARY OF THE INVENTION

A crab trap cage in accordance with the present invention includes circumferential spaced fill wires converging from an enlarged diameter circular base to a reduced diameter upper opening. Mutually spaced line wires encircle the cage and intersect the fill wires at cross over locations to thereby define discrete openings. The line and fill wires are preferably drawn from steel rod, and are secured to each other as by welding at the cross over locations. The line wires are indented between the cross over locations to accommodate the convergence of the fill wires.

These and other features and advantages of the present invention will now be described in greater detail with reference to the accompanying drawing, wherein:

DETAILED DESCRIPTION OF PREFERRED EMBODIMENT

Figure 1:
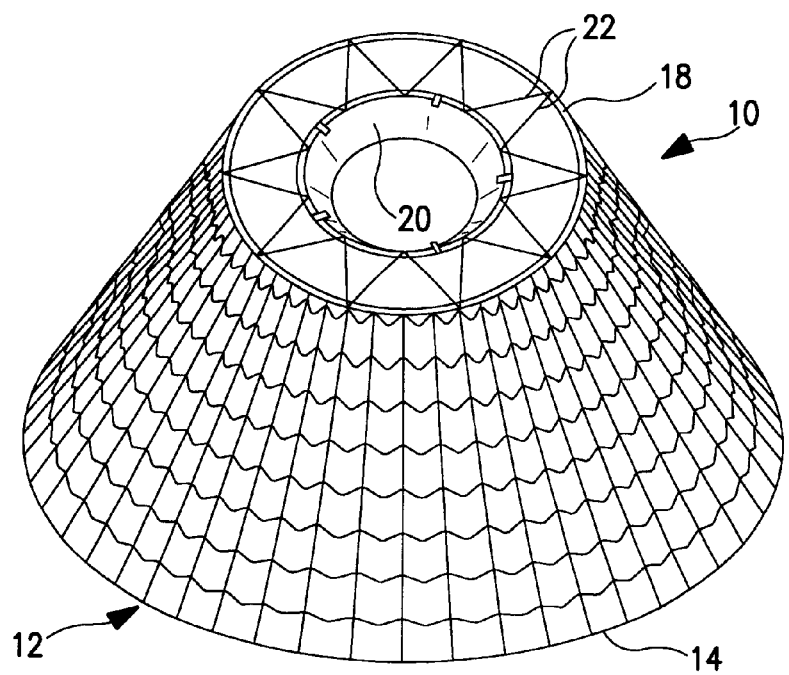
FIG. 1 is a perspective view of a crab trap with a cage constructed in accordance with the present invention.
Figure 2:
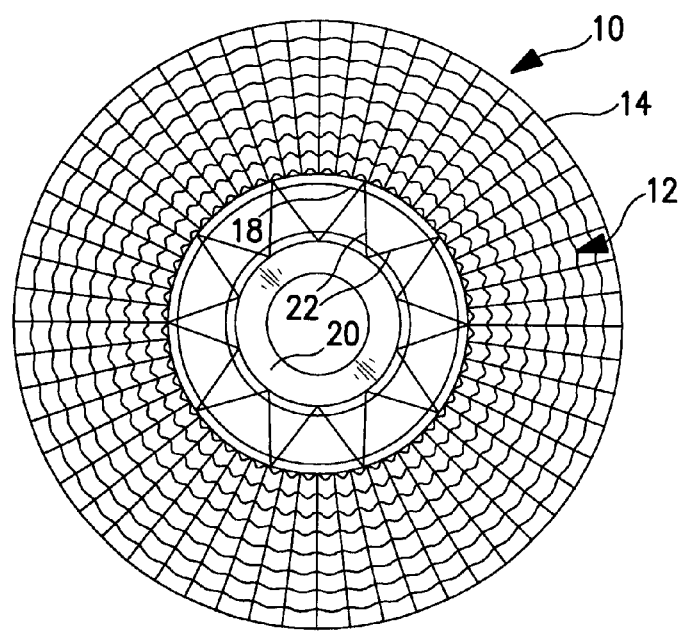
FIG. 2 is a top view of the trap.
Figure 3:
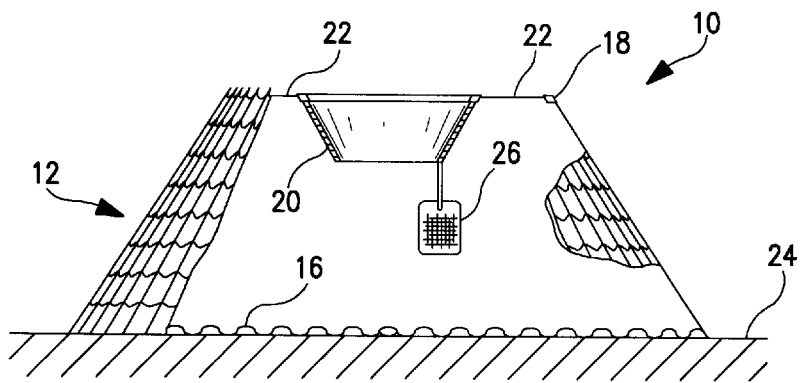
FIG. 3 is a side view of the trap with portions of the cage broken away.

With reference initially to FIGS. 1–3, a crab trap is generally depicted at 10. The trap includes a truncated right circular conical cage 12 constructed in accordance with the present invention. The cage has an enlarged diameter circular base 14 closed by a seine 16 or the like, and a reduced diameter upper opening 18. An entry funnel 20 is supported at the upper cage opening by interlaced roping 22 or the like.

As shown in FIG. 3, the trap 10 is submersible and configured to be lowered by means of a rope (not shown) onto the seated 24. A bait package 26 is suspended in the trap to attract crabs from the surrounding area. The crabs crawl up the sloping side of the cage and enter the trap via the funnel 20. Once in the trap, the crabs are prevented from escaping by the reverse slope of the cage.

Although not shown, it will be understood that upon retrieval of the trap, the seine is configured to be readily opened to accommodate dumping of crabs from the trap interior.

Figure 4:
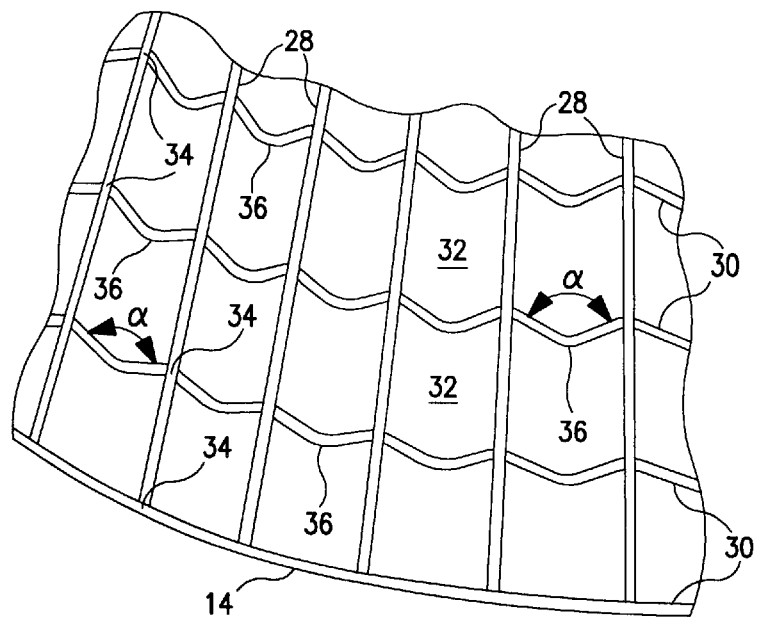
FIG. 4 is an enlarged side view of a portion of the cage.

As can best be seen by additional reference to FIG. 4, the cage 12 is constructed from circumferential spaced fill wires 28 converging from the base 14 to the upper opening 18, and vertically spaced line wires 30 encircling the cage and intersecting the fill wires to thereby define discrete openings 32. The fill and line wires 28, 30 are secured to each other at cross over locations 34, and the line wires are indented as typically indicated at 36 to accommodate the convergence of the fill wires.

The line and fill wires are preferably drawn from steel rod, and are secured to each other at the cross over locations by welding. The welded structure is then advantageously galvanized and coated with plastic to safeguard against destruction by salt water.

The intersections of the line wires 30 form angles α which decrease progressively from obtuse angles adjacent the base 14 to acute angles adjacent the upper opening 18.

Figures 5, 6:
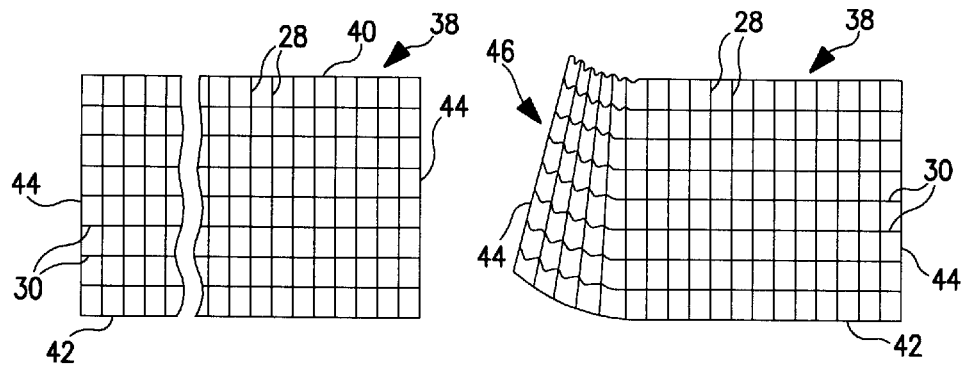
FIG. 5 is a side view of a rectangular panel of a welded wire mesh used to form the cage.
FIG. 6 is a view similar to FIG. 5 showing a stage in the formation of the cage.

The method of forming the cage 12 begins with the provision of a rectangular welded wire panel 38, as shown in FIG. 5. The panel is comprised of the intersecting fill and line wires 28, 30, and is configured with parallel top and bottom edges 40, 42, and paralleled side edges 44.

As shown at 46 in FIG. 6, the line wires 30 are then progressively indented to gradually form the panel into a right circular conical configuration. Cage formation is completed by joining the side edges 44 with metal clips or the like (not shown) in a manner well known to those skilled in the art. The thus formed cage is then assembled with the seine 16 and entry funnel 20.

In light of the forgoing, it will now be appreciated by those skilled in that art that the cage of the present invention is relatively light weight with an integral welded construction fully capable of withstanding rigorous usage and exposure to salt water and the elements.

I claim:

1. A truncated right circular conical cage for trapping crustaceans, said cage comprising:
    circumferential spaced fill wires converging from a circular base of said cage to a reduced diameter upper opening of said cage; and
    mutually spaced line wires encircling said cage and intersecting said fill wires at cross over locations to thereby define discrete openings, said line wires being secured to said fill wires at said cross over locations and being indented between said cross over locations to accommodate the convergence of said fill wires.

2. The cage of claim 1 wherein said line wires are secured to said fill wires by welding.

3. The cage of claims 1 or 2 wherein the indentations of said line wires are defined by two angularly disposed segments.

4. The cage of claim 3 wherein the angles defined by said segments decrease progressively from obtuse angles adjacent said base to acute angles adjacent said upper opening.

5. A method of forming a truncated right circular conical cage for use in trapping crustaceans, said method comprising:
    providing a rectangular wire mesh panel having parallel fill wires extending from a bottom edge to a top edge of said panel, and parallel line wires extending from one side edge to the other side edge of said panel, said fill and line wires being secured to one another at cross over locations to thereby define discrete rectangular openings;

forming the bottom edge of said panel into a circular base while indenting said line wires between said cross over locations to accommodate formation of the top edge of said panel into a circle defining an upper opening of reduced diameter as compared to the diameter of said base; and interconnecting the side edges of the thus formed panel.

* * * * *